Figure 1:
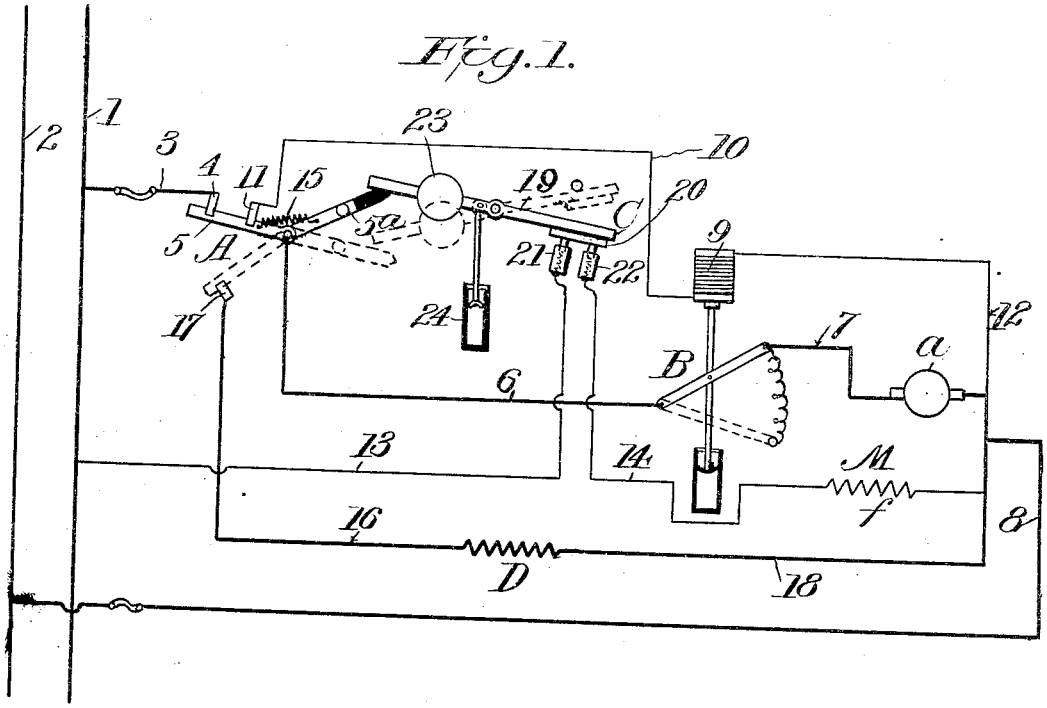

G. H. WHITTINGHAM.
MEANS FOR STOPPING ELECTRIC MOTORS.
APPLICATION FILED OCT. 2, 1908.

965,670.

Patented July 26, 1910.

Witnesses

Inventor
George H. Whittingham
By
Robert H. Watson
Attorney

UNITED STATES PATENT OFFICE.

GEORGE H. WHITTINGHAM, OF BALTIMORE, MARYLAND, ASSIGNOR TO MONITOR MANUFACTURING COMPANY OF BALTIMORE CITY, A CORPORATION OF MARYLAND.

MEANS FOR STOPPING ELECTRIC MOTORS.

965,670.  Specification of Letters Patent.  Patented July 26, 1910.

Application filed October 2, 1908. Serial No. 455,889.

*To all whom it may concern:*

Be it known that I, GEORGE H. WHITTINGHAM, a citizen of the United States, residing at Baltimore, in the State of Maryland, have invented certain new and useful Improvements in Means for Stopping Electric Motors, of which the following is a specification.

The purpose of this invention is to provide improved means for cutting off the current from an electric motor and stopping the rotation of its armature. In the operation of direct current electric motors, having shunt field windings, where the motor has to be stopped and started frequently, it is customary, in stopping, to either leave the field windings connected to the supply circuit, and disconnect only the armature, or to simultaneously disconnect both field and armature windings from the supply circuit, leaving the field windings on a closed circuit which includes the armature windings. This is done to avoid injury which might result to the insulation and switch terminals by the inductive discharge from the field windings if the field circuit were opened each time the motor stopped. It is also customary to connect the armature to a brake resistance circuit after the armature has been cut off from the supply circuit, so that the rotation of the armature will be stopped by the work which it performs in generating the current in this brake circuit. Where the field windings are left permanently connected to the supply circuit, a strong dynamic braking action takes place after the armature is disconnected from the supply circuit and is connected into the brake circuit, which is desirable; but this method results in a consumption of current, in the field windings, when the motor is stopped and not in use, and it also results in heating said windings. The heating of the windings not only changes the resistance of the windings, thereby affecting the speed of the motor, but many motors, intended for intermittent service, are wound with less wire on their fields than they ought to have for continuous service, and where such a motor is connected with its field permanently to the supply circuit, the field windings become very hot, causing considerable change in the resistance of the field and sometimes injury to the insulation of the wires. On the other hand, where the supply circuit is cut off from both the field and armature simultaneously each time the motor is stopped, and the field is left closed through the armature, the field quickly dies away and the dynamic brake effect, which is strong for an instant, becomes negligible as soon as the field dies out.

In order to obtain the full dynamic brake effect in stopping the motor, and yet without leaving the field permanently connected to the line, I provide separate armature and field switches, the latter being arranged to move to closed position and complete the supply circuit to the field each time the armature is connected to the supply circuit, and to open the field circuit slowly and automatically after the armature circuit has been opened. By providing this automatic, slow-opening switch in the field circuit, several important results are attained: First, the field is disconnected from the line when the motor is stopped for any length of time, thus saving current consumption and preventing overheating of the field; secondly, the current from the supply circuit flows through the field circuit as long as is necessary to give the full dynamic brake action; thirdly, during the slow opening movement of the field switch one or more air gaps of gradually increasing length are formed in the field circuit across which the current from the supply circuit continues to flow until the resistance of these gaps increases to such an extent that the potential of the supply circuit can no longer overcome the resistance, and the current then ceases to flow. This gradual increase in the length of the air gaps results in a gradual reduction of the quantity of current flowing in the field winding and a gradual deënergization of the field, so that, when the arcs break, there is no inductive discharge from the field that can injure either contacts or insulation.

Figure 2:
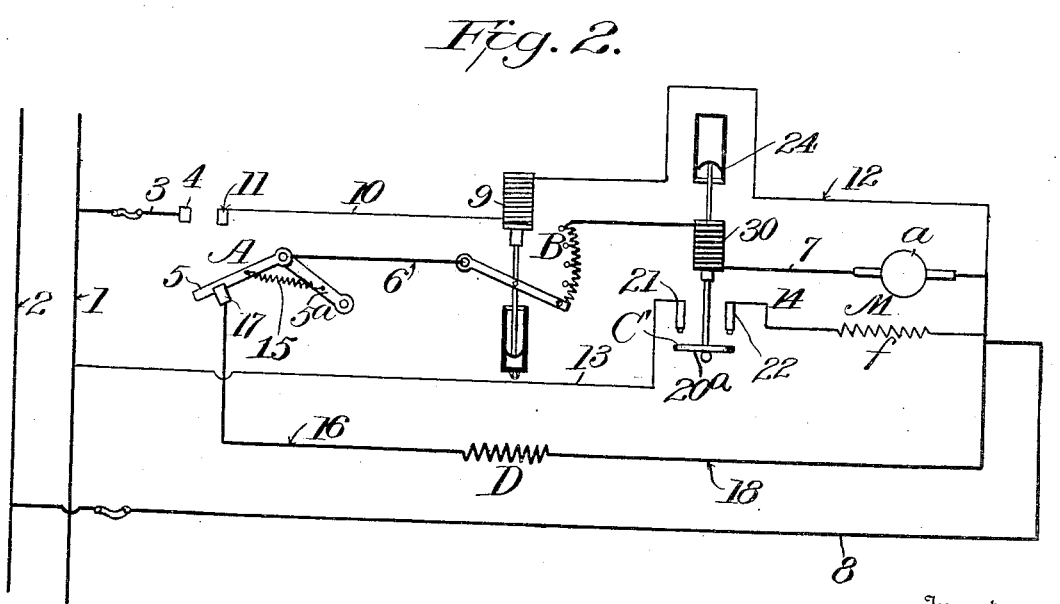

In the accompanying drawing, Figure 1 is a diagrammatic view illustrating the invention in one form, the switches being shown in running positions in full lines and in the stop positions in dotted lines; and, Fig. 2 is a similar view with a different arrangement of field switch, the parts being shown in the stop positions.

Referring to Fig. 1 of the drawing, 1 and 2 indicate the two sides of the supply circuit, and M indicates the motor to be operated, comprising an armature $a$ and a shunt field winding $f$. The armature circuit extends from the side 1 of the supply circuit, through conductor 3, contact 4, and blade 5 of a main switch A, conductor 6, starter B and conductor 7 to the armature, and thence through return wire 8 to the opposite side, 2, of the supply circuit. The starter may be of any desired type. The starter shown in the drawing has an operating solenoid 9 provided with windings of fine wire which are connected by a conductor 10 to a contact 11 on the switch A, and by a conductor 12 to the return conductor 8. The circuit of the shunt field winding $f$ extends from the side 1 of the supply circuit through conductor 13, field switch C, thence through conductor 14 to the field winding and thence by conductor 8 to the side 2 of the supply circuit. The main switch A, as shown in the drawing, is a well-known form of quick-break switch comprising the blade 5 and a handle $5^a$, pivoted end to end and connected by a spring 15, so that when the handle is turned the blade 5 is given a quick movement. In the position shown in full lines the blade 5 connects the solenoid 9 of the starter to the supply circuit, and also completes the circuit through the armature to the supply circuit. When moved in the opposite direction, as indicated in dotted lines, the switch blade 5 disconnects the solenoid of the starter and also the armature from one side of the supply circuit, and it closes the armature through a brake-resistance D which is connected by a conductor 16 to a contact 17 on the switch A, and by a conductor 18 to one brush of the armature. The brake circuit is then complete as follows: From the armature through conductor 7, starter B, conductor 6, blade 5, contact 17, conductor 16, brake-resistance D and conductor 18, back to the armature.

The field circuit is normally open at the switch C. This switch comprises a lever 19 having a carbon block 20 at one end adapted to engage copper terminals 21 and 22 connected to the field circuit, and having at its opposite end a weight 23 adapted to swing the lever away from said terminals. A dash pot 24 is connected to the lever and arranged to retard its movement away from the contacts 21 and 22; but to permit the lever to move freely in the opposite direction. The handle $5^a$ of the switch A is arranged so that it will engage and tilt the switch lever 19 to closed position when the blade 5 is moved to connect the motor armature to the supply circuit; but when the handle $5^a$ is moved to interrupt the armature circuit and connect in the brake circuit, the switch lever is left free to move slowly to open position, under the influence of the weight 23, and retarded by the dash pot 24.

In operation, when the switch A is moved into the position shown in full lines in the drawing, the supply circuit is completed through the armature and through the solenoid of the starter by the blade 5, and at about the same time the field circuit is completed by the closure of the field switch C, which is moved to closed position by the handle $5^a$. To stop the motor the handle $5^a$ is moved downward, causing the blade 5 to leave the contacts 4 and 11 and engage the contact 17, and also releasing the lever 19 of the switch C. The armature and the solenoid of the starter are then cut off from one side of the supply circuit, so that no current can pass through them from the supply circuit, and the brake-resistance circuit is closed; but the current from the supply circuit continues to flow through the field until the slowly moving switch contact 20 moves so far away from the contacts 21 and 22, that the current in the field circuit cannot pass across the gaps formed between the contact 20 and the contacts 21 and 22. Thus the current from the supply circuit is continued in the field for a certain length of time after the supply current is cut off from the armature and the latter is connected in the brake circuit, and then the current is cut off from the field. During this interval the armature, running under its own momentum, generates a strong current in the brake circuit which tends to stop the motor, and by properly timing the movement of the lever of the switch C a strong field may be maintained until the motor armature is stopped, after which the field current is interrupted.

In addition to the advantage of maintaining the field connected to the supply circuit for a sufficient length of time to allow the dynamic brake to act, the slow opening movement of the field switch permits the field circuit to be opened without the heavy inductive discharge from the field which takes place when an energized field coil is suddenly interrupted, and which is often injurious to the insulation and injurious to the switch terminals. When the field switch is slowly opened the potential of the line circuit causes arcs to form between the switch contact 20 and the terminals 21 and 22, and as the air gaps increase the arcs become longer and the resistance introduced in the field circuit becomes greater, thereby cutting down the quantity of current flowing in the field winding until at about the time when the arcs finally fail to leap the gap the current flowing is reduced to such a small quantity that the field is practically de-energized and hence no arcing takes place other than that due to the potential on the line, and there is no danger to insulation or injury to the contacts from the inductive discharge of an energized field. It is found, in practice, that the contacts of the field switch, made of copper and carbon, will last indefinitely where the switch is opened in this manner.

Instead of moving the field switch to closed position by the operation of the main switch, as shown in Fig. 1, the field switch may be closed by a magnet or solenoid through the coils of which current is admitted and cut off by the main switch. Such a magnet or solenoid may be in a circuit separate from the motor circuits; but in Fig. 2 of the drawing, I have shown a field switch C' movable to closed position by a solenoid 30 whose coils are in series with the armature. In this arrangement the solenoid will hold the field circuit switch closed until the dynamic current falls to a certain extent, when said switch will be released and open slowly, retarded by the dash pot.

In Fig. 2 the arrangement of circuits is the same as in Fig. 1, except that the solenoid 30 is connected in the conductor 7 of the armature circuit. The switch member 20ª is connected to the core of the solenoid and arranged so that when the solenoid lifts its core it will engage the terminals 21 and 22 of the field circuit, and when the solenoid releases its core, the member 20ª will drop away from said terminals slowly, retarded by the dash pot 24, the plunger of which is connected to the solenoid.

In the operation of the device shown in Fig. 2, when the switch A is connected to the terminals 4 and 11, the armature receives current through the starter and through the coils of the solenoid 30, and the solenoid of the starter is energized. The solenoid 30 immediately lifts its core, before the starting resistance is cut out, and the field circuit is thereby established and the motor operates. When the switch A is thrown to the off position, the supply current is cut off from the armature, the starter is deënergized, and the brake circuit is closed. The solenoid 30 then holds the field switch closed until the current generated by the armature falls to a given extent, when the solenoid 30 becomes weakened and its core then moves slowly downward, retarded by the dash pot, thus gradually diminishing the field strength by the gradual increase in the length of the gaps between the switch member 20ª and the terminals 21 and 22, until the resistance becomes so great that the current can no longer jump the gaps, when the arcs break and the field becomes dead. Usually, the dash pot alone, properly regulated, may be relied upon to maintain the current in the field for a sufficient length of time for the motor to stop; but in other cases the series solenoid will be found advantageous, as this prevents the movement of the field switch, and thereby maintains the field current in the field, until the motor has nearly come to a stop, after which the field current is gradually cut off.

What I claim is:—

1. A switch mechanism for motors having shunt field windings, comprising means for making and breaking connection between the armature and the supply circuit and for maintaining the armature on a closed circuit when the supply circuit is broken, and a field switch for making and breaking connection between the shunt windings and the supply circuit and adapted to move slowly and automatically from its closed to its open position after the connection of the armature to the supply circuit is broken and while the armature remains connected in the closed circuit.

2. A switch mechanism for motors having shunt field windings comprising a switch for opening and closing the supply circuit to the armature, a field switch movable to open position independently of the supply circuit switch and adapted to automatically open the field circuit after the armature circuit has been opened, and means for retarding the opening movement of said field switch.

3. A switch mechanism for motors having shunt field windings comprising a switch for opening and closing the supply circuit to the armature, a field switch movable to open position independently of the supply circuit switch and adapted to automatically open the field circuit after the armature circuit has been opened, and a dash pot for retarding the opening movement of said field switch.

4. A switch mechanism for motors having shunt field windings comprising a switch for opening and closing the supply circuit to the armature, a field switch arranged to connect the field windings to the supply circuit when the latter is completed to the armature and movable to open position independently of the supply circuit switch and adapted to automatically open the field circuit after the supply circuit to the armature is opened, and means for retarding the opening movement of the field switch.

5. The combination with a motor having shunt field windings, of a dynamic brake circuit, means for connecting the armature to the supply-circuit or to the dynamic brake circuit to start or stop the motor, and a field switch arranged to connect the field circuit to the supply circuit when the armature is connected to the latter circuit, said field switch being movable to open position independently of said means and adapted to open the field circuit after the armature has been connected to the brake circuit and means for retarding the opening movement of said field switch.

6. A switch mechanism for motors having shunt field windings comprising a switch for opening and closing the supply circuit to the armature, a field switch for connecting the field windings to the supply circuit, an electromagnetic device for moving said field switch to closed position, and a retarding device for retarding the opening movement of said field switch.

7. A switch mechanism for motors having shunt field windings comprising a switch for opening and closing the supply circuit to the armature, a field switch for connecting the field windings to the supply circuit, an electromagnetic device having windings in the armature circuit for moving said field switch to closed position, and a retarding-device for retarding the opening movement of said field switch.

8. The combination with a motor having shunt field windings, of a dynamic brake circuit, means for connecting the armature to the supply circuit or to the dynamic brake circuit to start or stop the motor, a field switch for connecting the field windings with the supply circuit, an electromagnetic device having windings in the armature circuit for moving said field switch to closed position, and a retarding device for retarding the opening movement of said field switch.

9. A switch mechanism for motors having shunt field windings comprising a switch for opening and closing the supply circuit to the armature, and a field switch movable to open position independently of said first mentioned switch and adapted to keep the field windings connected to the supply circuit after the armature has been disconnected and then to automatically interrupt the flow of current through the field windings and means for retarding the opening movement of said field switch.

In testimony whereof I affix my signature, in presence of two witnesses.

GEORGE H. WHITTINGHAM.

Witnesses:
  FELIX R. SULLIVAN,
  F. S. KEMP.